(No Model.)
C. WORDEN.
HOLDER OR RACK.
No. 481,455. Patented Aug. 23, 1892.
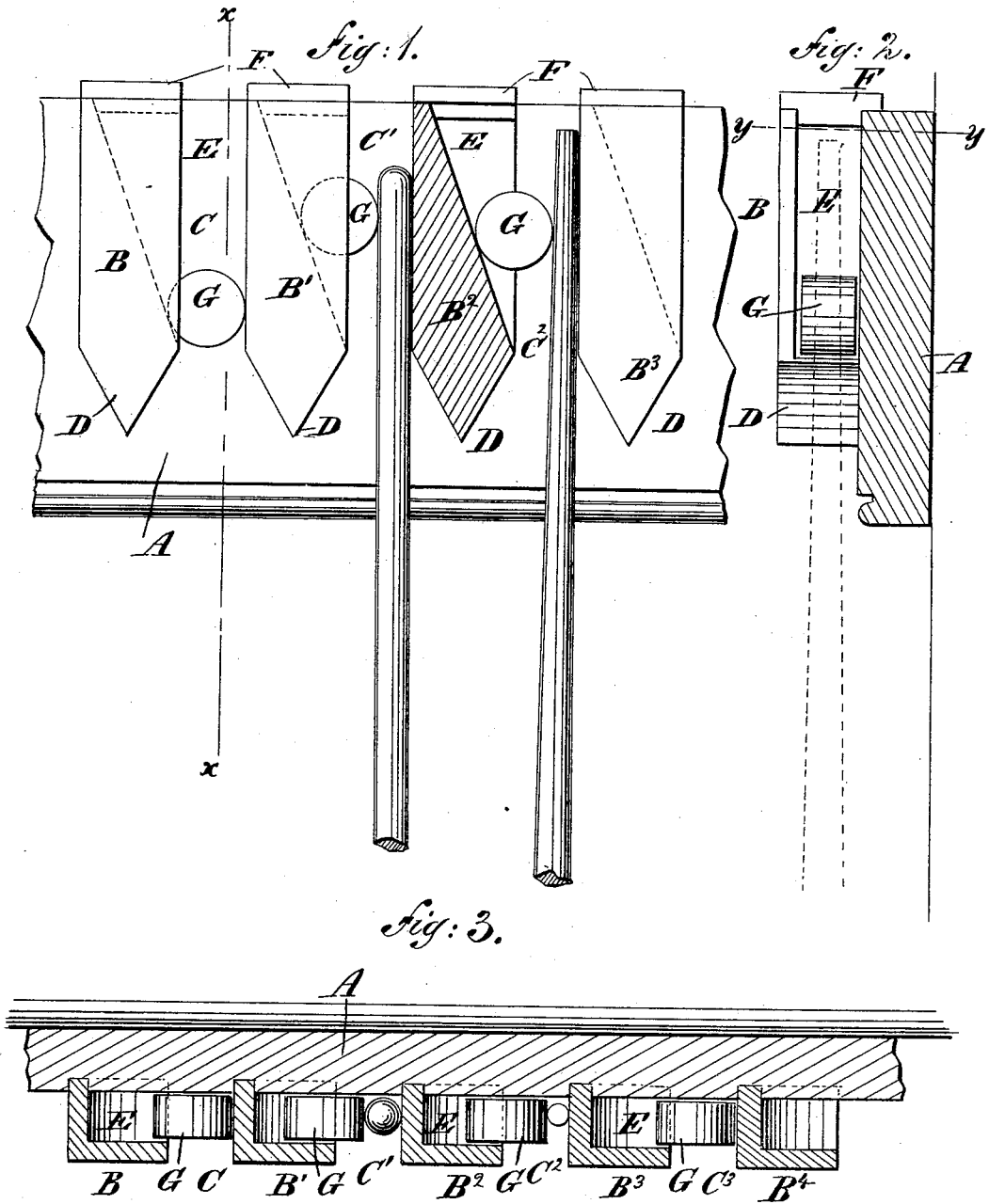
WITNESSES:
Chas. Nida.
C. Sedgwick.
INVENTOR:
C. Worden
BY
Munn & Co.
ATTORNEYS

UNITED STATES PATENT OFFICE.

CHARLES WORDEN, OF RYE, NEW YORK.

HOLDER OR RACK.

SPECIFICATION forming part of Letters Patent No. 481,455, dated August 23, 1892.

Application filed March 13, 1891. Serial No. 384,916. (No model.)

*To all whom it may concern:*

Be it known that I, CHARLES WORDEN, of Rye, in the county of Westchester and State of New York, have invented a new and Improved Holder or Rack, of which the following is a full, clear, and exact description.

The object of the invention is to provide a new and improved holder or rack more especially designed to conveniently and securely support brooms, billiard-cues, and like-handled articles, and which is simple and durable in construction, automatically engages and clamps the handle of the article, and permits of readily removing the article from the holder or rack whenever desired.

The invention consists of a series of vertically-arranged ribs or lugs, between which the handle of the article is passed, and a roller held to travel in a recess formed in the innermost side of one of the said ribs or lugs, the bottom of the recess being inclined outward and upward from near the lower end of the respective rib.

The invention also consists of various parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a front view of the improvement with one of the ribs or lugs in section. Fig. 2 is a transverse section of the same on the line $x\,x$ in Fig. 1, and Fig. 3 is a sectional plan view of the same on the line $y\,y$ in Fig. 2.

The improved holder or rack is provided with a back or wall board A, adapted to be fastened on a wall or other support in any suitable manner.

On the front of the board A are arranged a series of ribs or lugs B B' B² B³, &c., extending vertically so as to form between two adjacent ribs or lugs the spaces C C' C², &c., into which the handle of the article to be supported is passed. The lower ends of the ribs or lugs B B' B², &c., are pointed, as at D, so as to permit of conveniently inserting the handle into the space C, C', or C², &c., from below. Each of the lugs B B' B² is provided on one side with a recess E, the bottom of which is inclined, as is plainly shown in Fig. 1, the inclination extending from near the lower end of the lug outward and upward. The upper end of the recess is closed by a suitable cap F, secured partly on the respective lug B B and the wall-board A.

In each of the recesses is held a roller G, adapted to travel with its periphery on the inclined bottom of the respective recess, the diameter of the said roller being somewhat larger than the width of the respective space C C' C², so that when the roller is in its lowermost position, as shown to the left in Fig. 1, the right-hand side rests against the opposite straight side of the next following lug B' B² B³. The roller G is thus prevented from rolling out of its recess and becoming lost.

The device is used as follows: When the board A is fastened on a wall or other support, the lugs B B', &c., extend vertically, so that the rollers G travel into their lowermost position, as shown to the left in Fig. 1. Now when the operator desires to support the handle of a broom, cue, or like article in the holder or rack he passes the end of the handle between the pointed ends D of the two adjacent lugs, so as to engage the lower side of the respective roller held between the said lugs, whereby the roller is caused to travel upward into the recess E and upward and inward on the inclined bottom of the said recess. A further upward movement of the handle of the article in the respective space C, C', or C² causes the roller G to travel so far inward as to permit the handle to pass the said roller. The operator then releases the handle so that the roller presses on one side of the handle, the opposite side resting against the straight side of the next following lug. The roller is sufficiently heavy to press with such force upon the handle as to support the article in place on the holder or rack. When the operator desires to disengage the article from the rack, he moves the handle upward slightly, so that the roller G travels upward and slightly inward to permit of drawing the handle forward and out of the respective space C C' C². The roller then by its own gravity travels down the inclined bottom of the respective recess E to its former resting position. (Shown to the left in Fig. 1.)

It will be seen that when the handle has been engaged by the roller, as above described, and the operator releases his hold on the handle, then the article is securely held in place by the roller, and especially if the article having the handle is very heavy. The greater the downward pressure on the handle the tighter the roller G will press against the said handle.

In hanging up various articles—such as brooms, cues, and the like—the handle is not liable to warp, as it is freely suspended from near its upper end.

Having thus described my invention, I claim as new and desire to secure by Letters Patent—

In a holder or rack, the combination, with a wall-board, of a series of vertically arranged and spaced ribs or lugs secured to the wall-board, having pointed ends and provided in one side with recesses having inclined bottoms, and a roller in each recess, substantially as described, whereby a handle when inserted in the space between two ribs will be pressed by the roller against the side of the adjacent rib or lug and held thereby, substantially as herein shown and described.

CHARLES WORDEN.

Witnesses:
EDWARD BARUCH,
BERNHARD BARUCH.